(12) United States Patent
Shelestak et al.

(10) Patent No.: US 7,666,806 B2
(45) Date of Patent: Feb. 23, 2010

(54) GRAY GLASS COMPOSITION

(75) Inventors: Larry J. Shelestak, Bairdford, PA (US);
Dennis G. Smith, Butler, PA (US);
James M. Baldauff, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 640 days.

(21) Appl. No.: 11/264,908

(22) Filed: Nov. 2, 2005

(65) Prior Publication Data

US 2007/0099788 A1 May 3, 2007

(51) Int. Cl.
*C03C 3/095* (2006.01)
*C03C 3/087* (2006.01)

(52) U.S. Cl. ............... 501/64; 501/70; 501/71; 428/426

(58) Field of Classification Search .......... 501/64, 501/70, 71; 428/426
See application file for complete search history.

(56) References Cited

U.S. PATENT DOCUMENTS

| | | | |
|---|---|---|---|
| 3,723,142 A | 3/1973 | Kato et al. .................... 106/52 |
| 4,190,452 A | 2/1980 | Fischer et al. ................ 106/52 |
| 4,339,541 A | 7/1982 | Ruye ............................ 501/71 |
| 4,769,347 A | 9/1988 | Cooke et al. .................. 501/64 |
| 5,036,025 A | 7/1991 | Lin .............................. 501/48 |
| 5,061,659 A | 10/1991 | Ciolek et al. ................. 501/64 |
| 5,190,896 A | 3/1993 | Pucilowski et al. ........... 501/64 |
| 5,264,400 A | 11/1993 | Nakaguchi et al. ........... 501/71 |
| 5,300,465 A | 4/1994 | Grateau et al. ............... 501/13 |
| 5,318,931 A | 6/1994 | Nakaguchi et al. ........... 501/64 |
| 5,364,820 A | 11/1994 | Morimoto et al. ............ 501/71 |
| 5,380,685 A | 1/1995 | Morimoto et al. ............ 501/71 |
| 5,446,007 A | 8/1995 | Krashkevich et al. ......... 501/64 |
| 5,478,783 A | 12/1995 | Higby et al. .................. 501/27 |
| 5,558,942 A | 9/1996 | Itoh et al. ..................... 428/426 |
| 5,565,388 A | 10/1996 | Krumwiede et al. .......... 501/70 |
| 5,656,559 A | 8/1997 | Combes et al. ............... 501/70 |
| 5,747,398 A | 5/1998 | Higby et al. .................. 601/66 |
| 5,763,342 A | 6/1998 | Mita et al. .................... 501/64 |
| 5,776,846 A | 7/1998 | Sakaguchi et al. ............ 501/70 |
| 5,830,814 A | 11/1998 | Combes ....................... 501/70 |
| 5,837,629 A | 11/1998 | Combes et al. ............... 501/70 |
| 5,908,702 A | 6/1999 | Mita et al. .................... 428/426 |
| 5,910,460 A | 6/1999 | Penrod ........................ 501/27 |
| 5,928,974 A | 7/1999 | Penrod ........................ 501/27 |
| 5,958,811 A | 9/1999 | Sakaguchi et al. ............ 501/71 |
| 5,977,002 A | 11/1999 | Boulos et al. ................ 501/71 |
| 6,114,264 A | 9/2000 | Krumwiede .................. 501/70 |
| 6,235,666 B1 | 5/2001 | Cochran et al. ............... 501/64 |
| 6,333,287 B1 * | 12/2001 | Seto ............................. 501/70 |
| 6,753,280 B2 * | 6/2004 | Seto et al. ..................... 501/70 |
| 7,162,892 B2 * | 1/2007 | Smith et al. .................. 65/99.4 |
| 7,414,000 B2 * | 8/2008 | Smith et al. .................. 501/70 |
| 2001/0006927 A1 | 7/2001 | Cochran et al. |
| 2002/0058579 A1 * | 5/2002 | Seto et al. ..................... 501/71 |
| 2003/0083188 A1 * | 5/2003 | Seto et al. ..................... 501/71 |
| 2004/0043886 A1 * | 3/2004 | Akada et al. .................. 501/64 |
| 2004/0186001 A1 * | 9/2004 | Seto et al. ..................... 501/70 |
| 2005/0020430 A1 * | 1/2005 | Thomsen et al. .............. 501/64 |
| 2005/0170944 A1 * | 8/2005 | Arbab et al. .................. 501/64 |
| 2006/0189472 A1 * | 8/2006 | Longobardo et al. .......... 501/71 |

FOREIGN PATENT DOCUMENTS

| | | |
|---|---|---|
| EP | 0709344 B1 | 1/1999 |
| EP | 0677492 B1 | 9/1999 |
| EP | 1 041 050 A1 | 4/2000 |
| EP | 1041050 A1 | 10/2000 |
| EP | 0811581 B1 | 9/2002 |
| EP | 1000910 B1 | 3/2003 |
| GB | 2252973 | 8/1992 |
| JP | 53-085813 | 7/1978 |
| JP | 63-277537 | 11/1988 |
| JP | 41-87539 | 7/1992 |
| JP | 2002-293568 | 9/2002 |
| SU | 614038 | 7/1978 |
| WO | WO94/14716 | 7/1994 |
| WO | WO94/18135 | 8/1994 |
| WO | WO96/00194 | 1/1996 |
| WO | WO96/28394 | 9/1996 |
| WO | WO99/01382 | 1/1999 |
| WO | WO99/35100 | 7/1999 |
| WO | WO00/29344 | 5/2000 |

OTHER PUBLICATIONS

International Search Report, PCT/US2006/042194, dated Apr. 27, 2007.

* cited by examiner

*Primary Examiner*—Karl E Group
*Assistant Examiner*—Elizabeth A Bolden
(74) *Attorney, Agent, or Firm*—Andrew C. Siminerio

(57) ABSTRACT

A glass composition that includes a base glass composition including: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent and BaO 0 to 1 weight percent, and a colorant and property modifying portion including total iron from 0.25 to 0.9 weight percent, $Cr_2O_3$ from 6 PPM to 400 PPM, $Er_2O_3$ from 0.3 to 3.0 weight percent, and $TiO_2$ from 0.1 to 0.8 weight percent, wherein the glass composition has a redox ratio ranging from 0.15 to 0.62.

20 Claims, No Drawings

GRAY GLASS COMPOSITION

FIELD OF THE INVENTION

The present invention relates to glass compositions, particularly, gray glass compositions that do not contain selenium.

BACKGROUND OF THE INVENTION

Glass substrates are used in a variety of applications such as automotive applications, architectural applications, aerospace applications, etc. Depending on the end use of the glass substrate, it will be desirable for the glass substrate to exhibit certain (a) aesthetic properties, such as, but not limited to, color and (b) solar control properties, such as, but not limited to, total solar energy transmittance ("TSET"), infrared transmittance and ultraviolet transmittance.

For example, in automotive applications, glass substrates are used as automotive vision panels (i.e., front windows, sidelights, etc.). Automotive vision panels need to exhibit a desirable color. At the present time, desirable colors for automotive vision panels include blue, bronze, green and gray. Further, if the automotive vision panel is used as a front windshield, it will have to exhibit a visible light transmittance ("Lta") of equal to or greater than 70% in the United States. The Lta requirement for front windshields in countries other than the United States may be different.

The aesthetic properties and solar control properties of a glass substrate can be modified in several of different ways. The first way involves depositing a coating on the surface of a glass substrate. The second way involves changing the chemical composition (i.e., the type of materials that make up the glass composition and/or the weight percentages of the various materials in the glass composition) that make up the glass substrate. Oftentimes, colorants and/or other materials capable of modifying the solar properties of the glass composition are added to a well known base glass composition, such as a soda-lime-silica base glass composition, to provide a glass substrate capable of exhibiting unique performance properties. Although the effect of one colorant or one material capable of modifying the solar properties of the glass composition may be known (for example, it is known that adding FeO to a base glass composition increases the infrared (IR) absorption of the glass composition), it is the essence of invention to use various colorants and/or materials capable of modifying the solar properties of the glass composition, each colorant or material capable of producing a unique effect individually, to achieve a combination of properties collectively.

According to the present invention, specific materials capable of modifying the solar properties of a glass composition are added in specific amounts to a soda-lime-silica base glass composition to provide glass substrates capable of exhibiting the desired aesthetic and solar control properties. The combination of aesthetic and solar control properties provided by glass substrates formed from the glass composition of the present invention are as follows at a reference thickness of 0.1535 inches (3.9 mm):

1. a gray color characterized by a dominant wavelength ranging from 475 to 541 nanometers and an excitation purity less than or equal to 5 percent;
2. an Lta equal to or greater than 60 percent;
3. a total solar energy transmittance (TSET) of less than or equal to 60 percent; and
4. a total solar ultraviolet transmittance (SAE UV) of less than or equal to 49 percent.

SUMMARY OF THE INVENTION

In a non-limiting embodiment, the present invention is a glass composition comprising a base glass composition comprising: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent and BaO from 0 to 1 weight percent, and a colorant and property modifying portion comprising total iron from 0.25 to 0.9 weight percent, $Cr_2O_3$ from 6 PPM to 400 PPM, $Er_2O_3$ from 0.3 to 3.0 weight percent, and $TiO_2$ from 0.1 to 0.8 weight percent, wherein the glass composition has a redox ratio ranging from 0.15 to 0.62.

In another non-limiting embodiment, the present invention is a glass sheet comprising a glass composition that includes: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent and BaO from 0 to 1 weight percent, and a colorant and property modifying portion comprising total iron from 0.25 to 0.9 weight percent, $Cr_2O_3$ from 6 PPM to 400 PPM, $Er_2O_3$ from 0.3 to 3.0 weight percent, $TiO_2$ from 0.1 to 0.8 weight percent, wherein the glass composition has a redox ratio ranging from 0.15 to 0.62 and wherein the glass sheet exhibits one or more of the following performance properties at a thickness of 0.1535 inches (3.9 mm): a dominant wavelength ranging from 475 to 541 nanometers; an excitation purity of less than or equal to 5 percent; an Lta of equal to or greater than 60 percent; a TSET less than or equal to 60 percent; and a SAE UV of less than or equal to 49 percent.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 3.8, 6.6 to 9.7 and 5.5 to 10.

The glass composition of the present invention comprises a base glass portion and colorants and materials capable of modifying the solar control properties of the glass. Both colorants and materials capable of modifying the solar control properties of the glass are referred to herein as "colorants and property modifying materials". According to the present invention, the base glass portion includes the components in the amounts shown in Table 1 below.

TABLE 1

Base Glass Portion

| Component | Concentration in the Glass Composition [Weight Percent based on the Total Weight of the Glass Composition] |
|---|---|
| $SiO_2$ | 65–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% |

The described base glass portion is referred in the art as a "soda-lime-silica" glass composition.

According to the present invention, various colorants and materials capable of modifying the solar performance properties of the glass are added to the base glass composition. The colorants and property modifying materials included in the glass composition of the invention include: iron oxides (both ferric oxide ($Fe_2O_3$) and ferrous oxide (FeO)), chromium oxide ($Cr_2O_3$), erbium oxide ($Er_2O_3$) and titanium dioxide ($TiO_2$).

According to the present invention, iron can be present in the glass composition as both ferric oxide ($Fe_2O_3$) and ferrous oxide (FeO). As is well known in the art, $Fe_2O_3$ is a strong absorber of ultraviolet radiation and is a yellow colorant. As is well known in the art, FeO is a strong absorber of infrared radiation and is a blue colorant.

The "total iron" present in the glass composition of the invention is expressed in terms of the weight percentage of "$Fe_2O_3$" present in the glass composition as is standard practice in the industry. This does not imply that all of the iron present in the glass composition is in the form of $Fe_2O_3$. According to the present invention, the total iron in the glass composition of the present invention ranges up to and including 0.90 weight percent based on the total weight of the glass composition, for example, from 0.25 to 0.9 weight percent, or from 0.3 to 0.8 weight percent.

The amount of iron present in the ferrous state in the glass composition of the present invention is expressed in terms of the weight percentage of "FeO" present in the glass composition as is standard practice in the industry. Although the amount of iron in the ferrous state is expressed as FeO, the entire amount in the ferrous state may not actually be present in the glass as FeO.

The glass composition of the present invention has a certain "redox ratio". As used herein, the "redox ratio" is the amount of iron in the ferrous state (expressed as "FeO") divided by the amount of total iron (expressed as "$Fe_2O_3$"). Glass compositions according to the present invention have a redox ratio ranging from 0.15 to 0.62, for example, from 0.25 to 0.55, or from 0.3 to 0.5.

According to the present invention, the glass composition contains $Er_2O_3$ in an amount ranging from 0.3 weight percent to 3.0 weight percent, for example, from 0.4 weight percent to 2.1 weight percent, or from 1.0 weight percent to 2.0 weight percent, where the weight percent is based on the total weight of the glass composition. $Er_2O_3$ is known in the art as a pink colorant.

According to the present invention, the glass composition contains $Cr_2O_3$ in an amount ranging from 6 PPM to 400 PPM, for example, from 10 PPM to 300 PPM, or from 25 PPM to 150 PPM. $Cr_2O_3$ is known the art as a green colorant.

According to the present invention, the glass composition of the present invention contains $TiO_2$ in an amount ranging from 0.1 weight percent to 0.8 weight percent, for example, from 0.15 weight percent to 0.6 weight percent, or from 0.2 weight percent to 0.5 weight percent, where the weight percent is based on the total weight of the glass composition. $TiO_2$ is known in the art as a yellow colorant and an absorber of ultraviolet radiation.

According to the present. invention, the following optional colorants and property modifying materials can be added to the glass composition: cobalt oxide (CoO), neodymium oxide ($Nd_2O_3$), copper oxide (CuO), manganese oxide ($MnO_2$), cerium oxide ($CeO_2$), vanadium oxide ($V_2O_5$) and nickel oxide (NiO).

According to the present invention, the glass composition of the present invention can contain CoO in an amount ranging from 0 PPM to 15 PPM, for example, from 0 PPM to 12 PPM, or 0 PPM to 8 PPM. CoO is known in the art as a blue colorant.

According to the present invention, the glass composition of the present invention can contain $Nd_2O_3$ in an amount ranging from 0 weight percent to 1.0 weight percent, for example, from 0 weight percent to 0.5 weight percent, or from 0 weight percent to 0.25 weight percent, where the weight percent is based on the total weight of the glass composition. $Nd_2O_3$ is known in the art as a blue colorant.

According to the present invention, the glass composition of the present invention can contain CuO in an amount ranging from 0 weight percent to 0.5 weight percent, for example, from 0 weight percent to 0.3 weight percent, or from 0 weight percent to 0.1 weight percent, where the weight percent is based on the total weight of the glass composition. CuO is known in the art as a blue colorant.

According to the present invention, the glass composition of the present invention can contain $MnO_2$ in an amount ranging from 0 weight percent to 0.75 weight percent, for example, from 0 weight percent to 0.6 weight percent, or from 0 weight percent to 0.5 weight percent, where the weight percent is based on the total weight of the glass composition. $MnO_2$ is known in the art as an oxidizer to the iron oxide such that redox equilibrium of the iron oxide is shifted toward its oxidized form ($Fe_2O_3$) and the redox ratio of the glass composition is reduced. The inclusion of $MnO_2$ in the glass composition enables a higher concentration of iron oxide to be added to the glass batch for the purpose of enhancing both the ultraviolet and the infrared absorption of the glass composition while simultaneously maintaining a high visible transmittance.

According to the present invention, the glass composition of the present invention can contain $CeO_2$ in an amount ranging from 0 weight percent to 1.0 weight percent, for example, from 0 weight percent to 0.7 weight percent, or from 0 weight percent to 0.5 weight percent, where the weight percent is based on the total weight of the glass composition. $CeO_2$ is known in the art as a UV absorber.

According to the present invention, the glass composition of the present invention can contain $V_2O_5$ in an amount ranging from 0 weight percent to 0.3 weight percent, for example, from 0 weight percent to 0.2 weight percent, or from 0 weight percent to 0.1 weight percent, where the weight percent is based on the total weight of the glass composition. $V_2O_5$ is known in the art as a green colorant.

According to the present invention, the glass composition of the present invention can contain NiO in an amount ranging from 0 PPM to 150 PPM, for example, from 0 PPM to 100 PPM, or from 0 PPM to 50 PPM. NiO is known in the art as a brown colorant.

A proper balance between $Fe_2O_3$, FeO, $Cr_2O_3$, $Er_2O_3$, $TiO_2$, CoO, $Nd_2O_3$, CuO, $MnO_2$, $CeO_2$, $V_2O_5$ and NiO content is required to obtain the desired gray color.

In a non-limiting embodiment, the glass composition of the invention can contain molybdenum oxide ($MoO_3$) to inhibit the formation of nickel-sulfide stones which can be present in glass and degrade the quality of the glass. $MoO_3$ can be added to the composition of the invention in an amount ranging from 10 to 750 PPM, for example, from 100 to 300 PPM.

The glass composition of the present invention can be produced by conventional glass making processes. For example, the glass composition can be formed from batch materials via crucible melts, a sheet drawing process, a float glass process, etc. Typically, well known batch materials are mixed with other components to form the starting materials which are processed into the glass compositions of the present invention. In a non-limiting embodiment, the glass composition of the present invention is formed via a float glass process as is well known in the art.

As a result of the raw materials and/or equipment used to produce the glass composition of the present invention, certain impurities, for example, SrO and $ZrO_2$, can be present in the final glass composition. Such materials are present in the glass composition in minor amounts and are referred to herein as "tramp materials". Tramp materials do not contribute to the performance properties of the glass.

In a non-limiting embodiment of the invention, the described glass composition is formed into a glass substrate and/or laminated glass article as is well known in the art. Glass substrates having various thicknesses can be formed. For example, glass substrates having a thickness of up to 24 mm can be formed.

In a non-limiting embodiment, a glass substrate according to the present invention exhibits one or more of the following performance properties at a thickness of 0.1535 inches (3.9 mm):

1. a gray color characterized by a dominant wavelength ranging from 475 to 541 nanometers, for example, from 485 to 533 nanometers, or from 490 to 530 nanometers and an excitation purity of less than or equal to 5 percent, for example, less than or equal to 4 percent, or less than or equal to 3 percent;

2. an Lta of equal to or greater than 60 percent, for example, equal to or greater than 65 percent, or equal to or greater than 70 percent;

3. a TSET less than or equal to 60 percent for example, equal to or less than 57 percent, or equal to or less than 55 percent; and 4. a total solar ultraviolet transmittance (expressed in terms of "SAE UV") of less than or equal to 49 percent, for example, equal to or less than 47 percent, or equal to or less than 44 percent.

According to the present invention, the abovementioned performance properties are measured as described below. All solar transmittance data are calculated using air mass solar data according to ASTM am1.5 g (E892T.1). All of the transmittance values are integrated over the wavelength range using the Trapezoidal Rule, as is well known in the art.

The visible light transmittance (Lta) represents a computed value based on measured data using C.I.E. 1931 standard illuminant "A" over the wavelength range of 380 to 770 nanometers at 10 nanometer intervals.

The total solar ultraviolet transmittance (SAE UV) represents a computed value based on measured data over the wavelength range of 300 to 400 nanometers at 5 nanometer intervals using the SAE 1796 standard.

The total solar energy transmittance (TSET) represents a computed value based on measured transmittances from 300 to 2500 nanometers at 50 nanometer intervals.

Color is described in terms of dominant wavelength (DW) and the excitation purity (Pe) represent computed values based on measured data using a C.I.E. 1931 standard illuminant "C" with a 2° observer.

In a non-limiting embodiment of the invention, the glass substrate is used as a glass vision panel. In a further non-limiting embodiment, the glass vision panel is an automotive front windshield that exhibits an Lta equal to or greater than 70%.

EXAMPLES

The present invention is illustrated by the following non-limiting examples. The Examples 1-22 were made in the following manner.

The batch materials shown in Table 2 were weighed out and mixed thoroughly. Half of the batch materials were melted in a 4 inch silica crucible in an electric resistance furnace set to a temperature of 2,450° F. (1,343° C.) in an air atmosphere for 30 minutes. The furnace temperature was raised to 2,500° F. (1,371° C.), and the batch materials were heated for 30 minutes. The furnace temperature was raised to 2,550° F. (1,399° C.). The other half of the batch materials was added to the crucible and the batch materials were heated for 30 minutes. The furnace temperature was raised to 2,650° F. (1,454° C.), and the batch materials were heated for 30 minutes. The glass melt was then poured into water at room temperature (referred to as "glass fritting" in the art) to produce a glass frit. The glass frit was dried in an annealing oven set to a temperature of 1,100° F. (593° C.) for 20 minutes. The glass frit was placed back into a crucible, and the crucible was placed in an oven set to a temperature of 2,650° F. (1,454° C.). The glass frit was then heated in the oven for one hour. The contents of the crucible were fritted again as described above. The glass frit was placed in a crucible, and the crucible was placed in an oven set to a temperature of 2,650° F. (1,454° C.). The glass frit was then heated in the oven for two hours. The glass melt was cast on a metal table. The resulting glass sheet was placed into an annealing lehr set to a temperature of 1,125° F. (607° C.) for one hour. The power to the lehr was shut off, and the glass sheet was allowed to stay in the lehr for sixteen hours as it cooled down to room temperature. Examples made from the glass melts were ground and polished.

TABLE 2

Glass Batch Materials

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Sand [g] | 500.00 | 500.00 | 500.00 | 500.00 | 500.00 | 500.00 | 500.00 | 500.00 | 500.00 | 500.00 | 500.00 |
| Soda Ash [g] | 163.00 | 163.00 | 163.00 | 163.00 | 163.00 | 163.00 | 163.00 | 163.00 | 163.00 | 163.00 | 163.00 |
| Dolomite [g] | 102.00 | 102.00 | 102.00 | 102.00 | 102.00 | 102.00 | 102.00 | 102.00 | 102.00 | 102.00 | 102.00 |
| Limestone [g] | 64.00 | 64.00 | 64.00 | 64.00 | 64.00 | 64.00 | 64.00 | 64.00 | 64.00 | 64.00 | 64.00 |
| Salt Cake [g] | 2.50 | 2.50 | 2.50 | 2.50 | 2.50 | 2.50 | 2.50 | 2.50 | 2.50 | 2.50 | 2.50 |
| Coal [g] | 0.70 | 0.55 | 0.65 | 0.55 | 0.60 | 0.65 | 0.55 | 0.55 | 0.55 | 0.55 | 0.55 |
| Rouge [g] | 2.45 | 2.80 | 2.80 | 2.80 | 2.80 | 2.80 | 2.80 | 2.80 | 2.80 | 2.80 | 2.80 |
| $Cr_2O_3$ [g] | | | | | | | 0.070 | 0.140 | 0.210 | 0.070 | 0.070 |
| $Er_2O_3$ [g] | 11.90 | 10.50 | 10.50 | 11.90 | 11.90 | 11.90 | 11.90 | 11.90 | 11.90 | 14.00 | 14.00 |
| $TiO_2$ [g] | 2.10 | 2.45 | 2.45 | 2.10 | 2.10 | 2.10 | 2.10 | 2.10 | 2.10 | 2.10 | 2.80 |

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Sand [g] | 500.00 | 500.00 | 500.00 | 500.00 | 500.00 | 500.00 | 500.00 | 500.00 | 500.00 | 500.00 | 500.00 |
| Soda Ash [g] | 163.00 | 163.00 | 163.00 | 163.00 | 163.00 | 163.00 | 163.00 | 163.00 | 163.00 | 163.00 | 163.00 |
| Dolomite [g] | 102.00 | 102.00 | 102.00 | 102.00 | 102.00 | 102.00 | 102.00 | 102.00 | 102.00 | 102.00 | 102.00 |
| Limestone [g] | 64.00 | 64.00 | 64.00 | 64.00 | 64.00 | 64.00 | 64.00 | 64.00 | 64.00 | 64.00 | 64.00 |
| Salt Cake [g] | 2.50 | 2.50 | 2.50 | 2.50 | 2.50 | 2.50 | 2.50 | 2.50 | 2.50 | 3.50 | 3.50 |
| Coal [g] | 0.55 | 0.55 | 0.55 | 0.55 | 0.50 | 0.45 | 0.40 | 0.45 | 0.35 | 0.35 | 0.35 |
| Rouge [g] | 2.80 | 3.15 | 3.15 | 3.15 | 3.15 | 3.15 | 3.15 | 3.15 | 3.15 | 4.90 | 4.90 |
| $Cr_2O_3$ [g] | 0.070 | 0.070 | 0.070 | 0.070 | | | | | | | |
| $Er_2O_3$ [g] | 14.00 | 14.00 | 14.00 | 14.00 | 14.00 | 14.00 | 14.00 | 14.00 | 14.00 | 13.30 | 13.30 |
| $TiO_2$ [g] | 3.50 | 3.50 | 4.20 | 4.90 | 4.90 | 4.90 | 4.90 | 5.95 | 5.95 | 3.15 | 3.85 |

Compositional information for the exemplary glass compositions made according to the present invention is shown below in Table 3. The concentration of $Er_2O_3$ in the glass was calculated from the batch formula. The concentration of the other components was determined by x-ray fluorescence chemical analysis. The redox ratio was calculated from the concentration of iron oxides determined to be present in the glass composition.

BaO was found in the exemplary compositions in trace amounts, but it was not included in Table 3. BaO was not included in the table because it was not intentionally added when the examples were made.

The exemplary compositions did contain the following tramp materials which are not included in the table: $SO_3$, SrO, $ZrO_2$, and Cl.

TABLE 3

Exemplary Glass Compositions

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| FeO [wt %] | 0.2132 | 0.1722 | 0.2264 | 0.1862 | 0.1958 | 0.2215 | 0.1619 | 0.1821 | 0.1655 | 0.1466 | 0.1749 |
| redox | 0.618 | 0.437 | 0.582 | 0.480 | 0.502 | 0.565 | 0.414 | 0.468 | 0.421 | 0.376 | 0.452 |
| total iron [wt %] | 0.345 | 0.394 | 0.389 | 0.388 | 0.390 | 0.392 | 0.391 | 0.389 | 0.393 | 0.390 | 0.387 |
| $Cr_2O_3$ [PPM] | 6 | 8 | 10 | 6 | 7 | 8 | 110 | 209 | 303 | 106 | 111 |
| $Er_2O_3$ [wt %] | 1.70 | 1.50 | 1.50 | 1.70 | 1.70 | 1.70 | 1.70 | 1.70 | 1.70 | 2.00 | 2.00 |
| $TiO_2$ [wt %] | 0.256 | 0.300 | 0.299 | 0.259 | 0.260 | 0.260 | 0.262 | 0.263 | 0.260 | 0.258 | 0.337 |

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| FeO [wt %] | 0.1676 | 0.2037 | 0.2069 | 0.2209 | 0.2222 | 0.2010 | 0.1787 | 0.1804 | 0.1629 | 0.1835 | 0.1962 |
| redox | 0.433 | 0.476 | 0.480 | 0.515 | 0.505 | 0.459 | 0.407 | 0.411 | 0.367 | 0.276 | 0.296 |
| total iron [wt %] | 0.387 | 0.428 | 0.431 | 0.429 | 0.440 | 0.438 | 0.439 | 0.439 | 0.444 | 0.665 | 0.663 |
| $Cr_2O_3$ [PPM] | 110 | 107 | 104 | 106 | 8 | 8 | 8 | 9 | 8 | 9 | 9 |
| $Er_2O_3$ [wt %] | 2.00 | 2.00 | 2.00 | 2.00 | 2.00 | 2.00 | 2.00 | 2.00 | 2.00 | 1.90 | 1.90 |
| $TiO_2$ [wt %] | 0.421 | 0.445 | 0.501 | 0.547 | 0.575 | 0.577 | 0.581 | 0.703 | 0.703 | 0.385 | 0.459 |

Table 4 shows various performance properties of glass substrates having a thickness of 0.1535 inches (3.9 mm) formed from glass compositions according to the present invention. The spectral properties of the Examples were measured using a Perkin Elmer Lambda 9 spectrophotometer.

TABLE 4

Performance Properties of Substrates made from Glass Compositions according to the Present Invention

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Lta [%] | 73.80 | 75.76 | 73.25 | 75.25 | 74.86 | 73.52 | 74.45 | 71.74 | 70.91 | 74.85 | 73.14 |
| SAE UV [%] | 48.75 | 46.44 | 47.73 | 47.27 | 47.62 | 48.06 | 45.23 | 45.14 | 44.07 | 44.95 | 44.44 |
| TSET [%] | 48.27 | 52.79 | 47.17 | 51.42 | 50.41 | 47.77 | 52.85 | 49.31 | 50.04 | 54.62 | 50.79 |
| DW [nm] | 483.90 | 481.00 | 484.00 | 479.28 | 480.00 | 481.62 | 487.10 | 497.51 | 529.52 | 482.61 | 486.14 |
| Pe [%] | 3.28 | 3.28 | 4.57 | 3.86 | 4.09 | 4.75 | 1.82 | 1.77 | 1.68 | 1.54 | 2.07 |

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Lta [%] | 73.38 | 71.01 | 71.05 | 70.46 | 71.37 | 72.85 | 73.91 | 73.07 | 74.03 | 71.94 | 71.15 |
| SAE UV [%] | 43.00 | 38.99 | 39.64 | 40.84 | 38.44 | 38.93 | 38.40 | 35.85 | 35.62 | 31.11 | 30.46 |
| TSET [%] | 51.47 | 46.73 | 46.67 | 45.39 | 45.79 | 48.14 | 50.52 | 49.54 | 51.65 | 48.59 | 46.98 |
| DW [nm] | 488.63 | 497.29 | 493.27 | 490.46 | 485.42 | 483.75 | 480.63 | 487.68 | 481.24 | 492.31 | 496.61 |
| Pe [%] | 1.41 | 1.26 | 1.66 | 2.43 | 2.51 | 1.97 | 1.33 | 0.74 | 0.29 | 0.76 | 0.78 |

CONCLUSIONS

Based on Table 4, non-limiting examples of the glass composition of the present invention can be used to form glass substrates having a thickness of 0.1535 inches (3.9 mm) that exhibit one or more of the following performance properties: an Lta of greater than 68%, for example, from 70% to 76%; a TSET of less than 56%, for example, from 45% to 55%; a SAE UV of less than 50%, for example, from 30% to 49%; a DW ranging from 477 to 530 nm; and a Pe of less than or equal to 5%, for example, from 1% to 5%.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A glass composition comprising a base glass composition comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, and |
| BaO | 0 to 1 weight percent, | and a colorant and property modifying portion comprising:

| | |
|---|---|
| total iron | 0.25 to 0.9 weight percent, |
| $Cr_2O_3$ | 6 PPM to 400 PPM, |
| $Er_2O_3$ | 0.3 to 3.0 weight percent, |
| $TiO_2$ | 0.1 to 0.8 weight percent, | wherein the glass composition has a redox ratio in the range from 0.15 to 0.62 and the weight percent of the ingredients of the colorant and property modifying portion are selected to provide a glass piece that exhibits an Lta of equal to or greater than 60 percent at a thickness of 0.1535 inches (3.9 mm).

2. The glass composition according to claim 1, wherein the total iron ranges from 0.3 to 0.8 weight percent.

3. The glass composition according to claim 1 wherein the $Cr_2O_3$ ranges from 10 PPM to 300 PPM.

4. The glass composition according to claim 1, wherein the $Er_2O_3$ ranges from 0.4 weight percent to 2.1 weight percent.

5. The glass composition according to claim 1 wherein the $TiO_2$ ranges from 0.15 weight percent to 0.6 weight percent.

6. The glass composition according to claim 1 wherein the $Er_2O_3$ ranges from 1.0 weight percent to 2.0 weight percent.

7. The glass composition according to claim 1 wherein the redox ratio ranges from 0.25 to 0.55.

8. The glass composition according to claim 1 further comprising

CoO in an amount greater than 0 PPM to 15 PPM;
$Nd_2O_3$ in amount greater than 0 to 1.0 weight percent;
CuO in an amount greater than 0 to 0.5 weight percent;
$MnO_2$ in an amount greater than 0 to 0.75 weight percent;
$CeO_2$ in an amount greater than 0 to 1.0 weight percent;
$V_2O_5$ in an amount greater than 0 to 0.3 weight percent; and
NiO in an amount greater than 0 to 150 PPM.

9. A glass sheet made from the composition according to claim 1.

10. A glass sheet made from a class composition comprising a base glass composition comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, and |
| BaO | 0 to 1 weight percent, | and a colorant and property modifying portion comprising:

| | |
|---|---|
| total iron | 0.25 to 0.9 weight percent, |
| $Cr_2O_3$ | 6 PPM to 400 PPM, |
| $Er_2O_3$ | 0.3 to 3.0 weight percent, |
| $TiO_2$ | 0.1 to 0.8 weight percent, | wherein the glass composition has a redox ratio in the range from 0.15 to 0.62, and the glass sheet exhibits one or more of the following performance properties at a thickness of 0.1535 inches (3.9 mm):

a dominant wavelength ranging from 475 to 541 nanometers;
an excitation purity of less than or equal to 5 percent;
an Lta of equal to or greater than 60 percent;
a TSET less than or equal to 60 percent; and
a SAE UV of less than or equal to 49 percent.

11. A glass sheet according to claim 10 that exhibits one or more of the following performance properties at a thickness of 0.1535 inches (3.9 mm):

a dominant wavelength ranging from 485 to 533 nanometers;
an excitation purity of less than or equal to 4 percent;
an Lta of equal to or greater than 65 percent;
a TSET less than or equal to or less than 57 percent; and
a SAE UV of less than or equal to or less than 47 percent.

12. A laminated article made from at least one glass sheet according to claim 10.

13. A glass sheet comprising a glass composition that includes:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, and |
| BaO | 0 to 1 weight percent, | and a colorant and property modifying portion comprising:

| | |
|---|---|
| total iron | 0.25 to 0.9 weight percent, |
| $Cr_2O_3$ | 6 PPM to 400 PPM, |
| $Er_2O_3$ | 0.3 to 3.0 weight percent, |
| $TiO_2$ | 0.1 to 0.8 weight percent, | wherein the glass composition has a redox ratio ranging from 0.15 to 0.62 and wherein the glass sheet exhibits one or more of the following performance properties at a thickness of 0.1535 inches (3.9 mm):

a dominant wavelength ranging from 475 to 541 nanometers; an excitation purity of less than or equal to 5 percent;
an Lta of equal to or greater than 60 percent; a TSET less than or equal to 60 percent; and a SAE UV of less than or equal to 49 percent.

14. The glass sheet according to claim 13, wherein the total iron ranges from 0.3 to 0.8 weight percent.

15. The glass sheet according to claim 13, wherein the $Cr_2O_3$ ranges from 10 PPM to 300 PPM.

16. The glass sheet according to claim 13, wherein the $Er_2O_3$ ranges from 0.4 weight percent to 2.1 weight percent.

17. The glass sheet according to claim 13, wherein the $TiO_2$ ranges from 0.15 weight percent to 0.6 weight percent.

18. The glass sheet according to claim 13, wherein the $Er_2O_3$ ranges from 1.0 weight percent to 2.0 weight percent.

19. The glass sheet according to claim 13, wherein the redox ratio ranges from 0.25 to 0.55.

20. The glass sheet according to claim 13 further comprising

CoO in an amount greater than 0 PPM to 15 PPM;
$Nd_2O_3$ in amount greater than 0 to 1.0 weight percent;
CuO in an amount greater than 0 to 0.5 weight percent;
$MnO_2$ in an amount greater than 0 to 0.75 weight percent;
$CeO_2$ in an amount greater than 0 to 1.0 weight percent;
$V_2O_5$ in an amount greater than 0 to 0.3 weight percent; and
NiO in an amount greater than 0 to 150 PPM.

* * * * *